US007536709B2

(12) United States Patent
Shitano

(10) Patent No.: US 7,536,709 B2
(45) Date of Patent: May 19, 2009

(54) ACCESS CONTROL APPARATUS

(75) Inventor: Masaki Shitano, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 767 days.

(21) Appl. No.: 10/368,877

(22) Filed: Feb. 19, 2003

(65) Prior Publication Data

US 2003/0221011 A1 Nov. 27, 2003

(30) Foreign Application Priority Data

Feb. 19, 2002 (JP) .............................. 2002-041833

(51) Int. Cl.
  *G06F 17/30* (2006.01)
(52) U.S. Cl. .......................................... 726/2; 709/229
(58) Field of Classification Search ...................... 713/1, 713/2, 188, 194; 380/200, 201, 255, 277, 380/242; 726/2, 4; 709/229
  See application file for complete search history.

(56) References Cited

U.S. PATENT DOCUMENTS

| 5,555,241 | A | * | 9/1996 | Lazaridis et al. ............ 370/389 |
| 5,559,800 | A | * | 9/1996 | Mousseau et al. ........... 370/401 |
| 5,923,756 | A | * | 7/1999 | Shambroom ................ 713/156 |
| 6,115,471 | A | * | 9/2000 | Oki et al. ..................... 380/242 |
| 6,195,366 | B1 | * | 2/2001 | Kayashima et al. ......... 370/475 |
| 6,198,824 | B1 | * | 3/2001 | Shambroom ................ 380/279 |
| 6,237,023 | B1 |  | 5/2001 | Yoshimoto .................. 709/203 |
| 6,240,455 | B1 | * | 5/2001 | Kamasaka et al. .......... 709/229 |
| 6,640,302 | B1 | * | 10/2003 | Subramaniam et al. ..... 713/169 |
| 6,678,269 | B1 | * | 1/2004 | Michels et al. .............. 370/389 |
| 6,711,610 | B1 | * | 3/2004 | Harris ........................ 709/217 |
| 6,751,627 | B2 | * | 6/2004 | Sternin ....................... 707/101 |
| 7,012,503 | B2 | * | 3/2006 | Nielsen ...................... 340/5.6 |
| 2001/0040697 | A1 | * | 11/2001 | Wu et al. .................... 358/1.15 |
| 2002/0062365 | A1 |  | 5/2002 | Nishikawa et al. |

FOREIGN PATENT DOCUMENTS

| JP | 11-232193 A | 8/1999 |
| JP | 2001-346278 A | 12/2001 |
| JP | 2001-359176 A | 12/2001 |
| JP | 2002-044749 A | 2/2002 |
| JP | 2002-142271 A | 5/2002 |
| JP | 2002-186058 A | 6/2002 |

OTHER PUBLICATIONS

Japanese Office Action dated Jul. 20, 2004 (Japanese Patent Appln. No. 2002-041833).

* cited by examiner

*Primary Examiner*—Kimyen Vu
*Assistant Examiner*—Joseph Pan
(74) *Attorney, Agent, or Firm*—Locke Lord Bissell & Liddell

(57) ABSTRACT

An access control unit or network device generates an access key, and the access control unit records the address of the network device. The access key is output from the network device and input to a mobile telephone. In accordance with the access key received from the mobile telephone, the access control unit obtains the previously recorded address of the network device.

8 Claims, 13 Drawing Sheets

FIG. 6

ACCESS KEY

| NUMBER | | IP Address | ACCESS KEY |
|---|---|---|---|
| A 1 2 2 3 2 | | 127. 0. 0. 1 | 1234567890 |
| 9 9 0 A B | | 192. 100. 100. 2 | A123289Hh |
| 2 1 2 8 3 | | 192. 100. 100. 200 | SSS192002 |
| 2 8 3 8 3 | | 192. 101. 100. 21 | XA2828S98 |
| X A 2 2 8 2 | | 192. 100. 100. 119 | 28383a224 |
| 1 2 3 4 5 6 | | 192. 168. 100. 56 | P0982733x |
| S S S 1 9 | | 192. 100. 10. 119 | 21283a224 |
| P 0 9 8 2 | | 192. 168. 20. 123 | 990AB8831 |

1201   1202   1200

ACCESS CONTROL APPARATUS

RELATED APPLICATIONS

This application claims priority from and incorporates herein by reference the entire disclosure of Japanese Patent Application No.2002-041833, filed on Feb. 19, 2002.

FIELD OF THE INVENTION

This invention relates to an access control apparatus.

BACKGROUND OF THE INVENTION

It is becoming possible to connect a variety of consumer electronics and computer peripherals to networks. For example, providing network support for devices such as printers, projectors, scanners, digital cameras and digital video cameras is being considered. It is expected that such network-compatible devices will be connected not only to LANs but also to WANs such as the Internet.

There is growing demand for remote control of these network-compatible devices from portable terminals such as mobile phones and PDAs. In order comply with this demand, it is necessary to assign an IP (Internet Protocol) address to a network-compatible device operated over the Internet and make public the URL (Uniform Resource Locator) or IP address.

With the art described above, anyone who knows the URL or IP address of the network device is capable of operating the device without permission. For example, consider a residence surveillance system constructed according to the prior art described above. With a system of such kind, a large number of unspecified individuals, namely individuals other than the owner of the residence for which the system has been constructed, would be able to observe the conditions around the residence. This would not only constitute an invasion of privacy but could also allow a malicious third party to become aware of the fact that the owner of the residence is away from home. This could not help but encourage burglary.

Thus, a device control system or service that utilizes the Internet is disadvantageous in that an unintended party may use the controlled device without permission owing to the fact that the URL or IP address of the controlled device connected to the Internet is made public.

SUMMARY OF THE INVENTION

Accordingly, an object of the present invention is to make it possible to access a device of interest without disclosing the URL or IP address of the device to the operator.

Another object of the present invention is to make it unnecessary to inform a user of the network address of a network device and, in turn, to diminish the opportunities for an unauthorized third party to become aware of the network address, thereby reducing unauthorized access.

Another object of the present invention is to restrict users.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 6 is a diagram illustrating an example of output of an access key;

FIG. 12 is a diagram illustrating an example of an access-key management table according to the second embodiment.

DETAILED DESCRIPTION OF THE PREFERRED EMBODIMENTS

Embodiments of the present invention are illustrated below. These embodiments naturally are provided in order to facilitate working by those skilled in the art and are merely some of the embodiments included in the technical scope of the present invention established by the scope of the claims. Accordingly, even embodiments not directly set forth in the specification of this application are covered by the technical scope of the present invention as long as they share the common technical concept.

It should be noted that a plurality of embodiments are described for the sake of convenience. These embodiments not only each constitute an invention individually but also a number of them may be combined appropriately to constitute an invention.

First Embodiment

<System Configuration>

Figure 1:
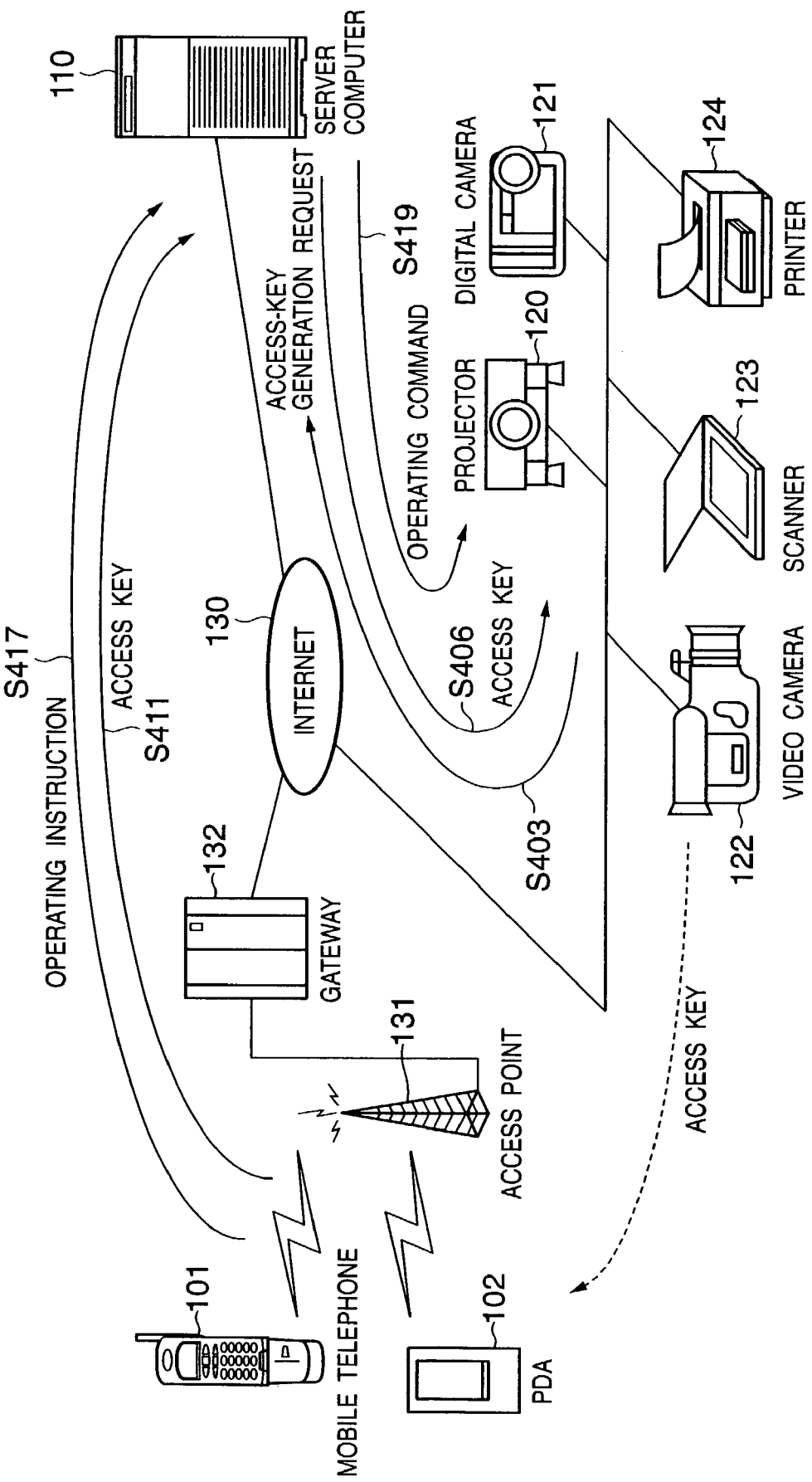
FIG. 1 is a diagram illustrating an example of the configuration of a system according to a first embodiment of the present invention.

FIG. 1 is a diagram illustrating the configuration of a remote control system according to a first embodiment of the present invention. A controller in this system essentially is a portable terminal such as a mobile telephone 101 or PDA (Personal Digital Assistant) 102.

The mobile telephone 101, which mounts a browser function in addition to the basic functions of a telephone, can be connected to the Internet 130 via a mobile telephone network. The PDA 102 is a personal information terminal that is portable, e.g., an electronic device small enough to be held in the palm of one's hand. The PDA 102 is equipped with a browser function, in a manner similar to that of the mobile telephone 101, and is connected to the network via an internal or external communication interface. The mobile telephone 101 and PDA 102 are connected to an access point 131, such as a base station of a mobile telephone, via a wireless link.

The access point 131 is connected to a gateway 132 via a mobile telephone network or packet network. The gateway 132 is a device serving as an interconnect between the mobile telephone network or packet network and the Internet 130.

A server computer 110 is connected to the Internet 130. The server computer 110 has ordinary Web server functions, such as a function for responding to an object request transmitted from a client computer connected to the network. In this embodiment, the server computer 110 further includes a function for generating an access key, a function for managing the access key and the IP addresses or URLs of devices 120 to 124, a function for managing system user information, a function for executing authentication processing based upon the above-mentioned management information, and a function for issuing commands for controlling the devices.

Examples of controlled network devices connected to the Internet 130 are a projector 120, a digital camera 121, a video camera 122, a scanner 123 and a printer 124. These devices have, in addition to their inherent function, have a function for connecting to a network and communication information, a function for analyzing messages transmitted from the server computer 110 and controlling drivers corresponding to the devices, a function for acquiring an access key from the server computer 110, and a function for displaying the access key on display means.

Thus, this remote control system envisages a case where the devices 120 to 124 connected to the network are remotely controlled from the mobile telephone 101 or PDA 102, which is employed by a user, via the server computer 110.

<Hardware Implementation>

Figure 2:
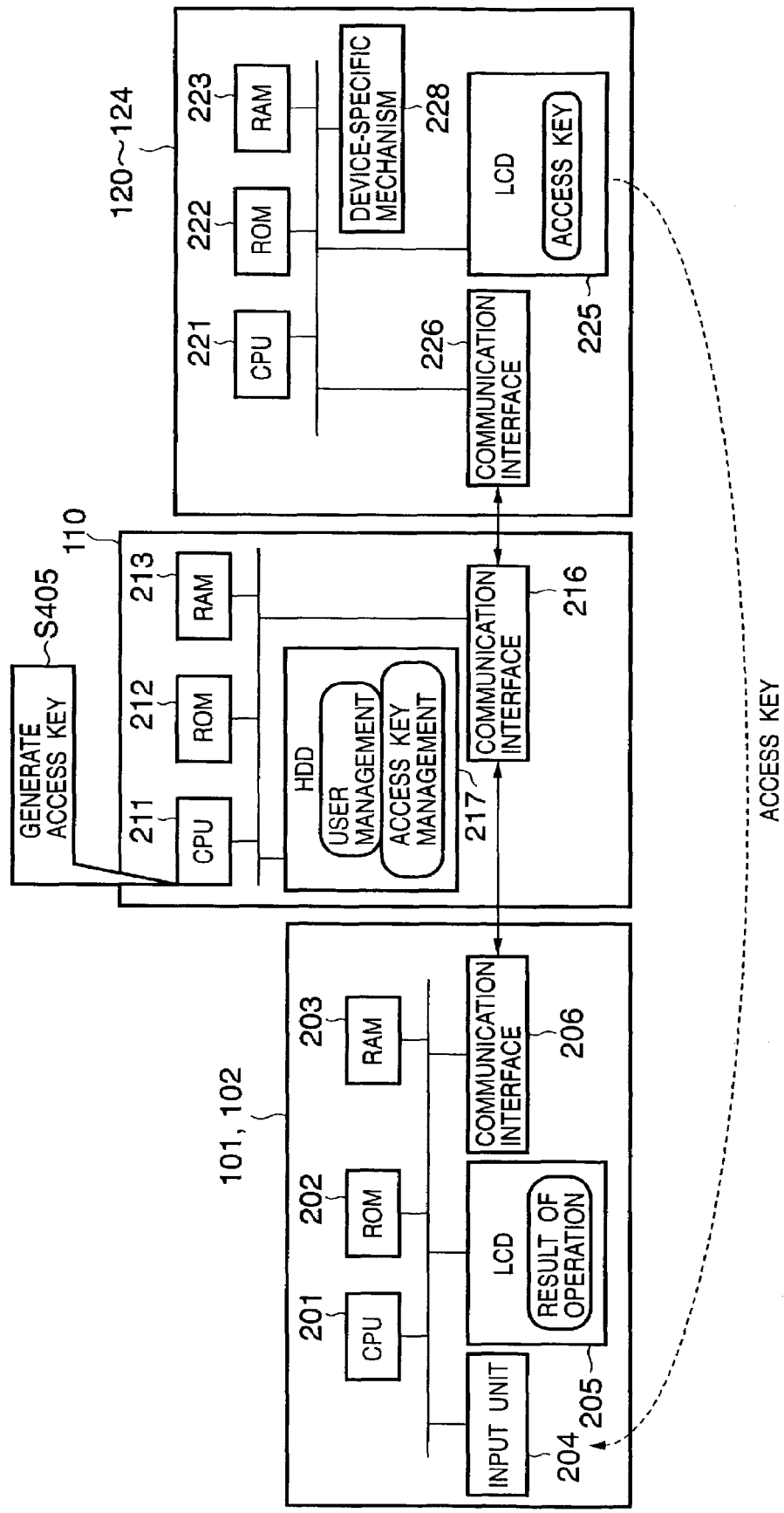
FIG. 2 is a diagram illustrating the hardware implementation of various devices according to the first embodiment.

FIG. 2 illustrates an example of the hardware implementation of each device according to this embodiment.

The mobile telephone 101 and PDA 102 are equipped with a CPU 201, a ROM 202, a RAM 203, an input unit 204, an LCD 205 and a communication interface 206, etc.

When power is introduced, the CPU 201 starts up in accordance with a booting program that has been stored in the ROM 202 and loads an operating system and an application program (described later) from the ROM 202, etc., to the RAM 203, whereby the device functions as a mobile telephone or PDA. The input unit 204 serves as input means such as a keyboard, pointing device and touch-sensitive panel, or as a short-distance communication device such as a Bluetooth or IrDA device. In the case of a short-distance communication device, the input unit 204 communicates with similar short-distance communication devices (not shown) mounted in the network devices 120 to 124, whereby an access key is input from the network devices 120 to 124. Thus, the input unit 204 may be of any type so long as it is capable of entering an access key. The LCD 205 is a liquid-crystal display device and displays various information such as the results of operating the network devices. The communication interface 206, which is a communication unit that includes a wireless communications device, operates in line with the specifications of a mobile telephone.

The server computer 110 has a CPU 211, a ROM 212, a RAM 213, a hard-disk drive 217 and a communication interface 216, etc. When power is introduced, the CPU 211 starts up in accordance with a booting program that has been stored in the ROM 212 and loads an operating system and an application program from the ROM 212 and hard-disk drive 217, etc., to the RAM 213, whereby the computer functions as server. The communication interface 216 is a communication device such as a network card (NIC) for achieving an Internet connection. The communication interface 216 sends and receives data to and from the mobile telephone 101, PDA 102 and network devices 120 to 124 via the Internet 130. For example, the communication interface 216 reports an access key to the network devices 120 to 124 via the Internet 130 and accepts the access key from the mobile telephone 101 and PDA 102 via the Internet 130.

The hard-disk drive 217 is a large-capacity storage device such as a hard disk and stores client management data and access-key management data according to this embodiment. This access-key management data is stored in an access-key management table 500 (see FIG. 5), described later. The access-key management table 500 is provided within the hard-disk drive 217. The access-key management table 500 may be provided in the RAM 213, and the access-key management data may be provided in access-key management table 500. The CPU 211 generates an access key and stores the access key in the access-key management table 500 together with the corresponding address information.

The network devices 120 to 124 are devices having a function for enabling connection to a network. By way of example, these devices are the aforementioned projector 120, digital camera 121, video camera 122, scanner 123 and printer 124. The network devices 120, etc., have a CPU 221, a ROM 222, a RAM 223, an LCD 225, a communication interface 226 and a device-specific mechanism 228, etc.

When power is introduced, the CPU 221 starts up in accordance with a booting program that has been stored in the ROM 222 and loads an operating system and an application program (described later) from the ROM 222, etc., to the RAM 223, whereby the device functions as a digital camera, etc. The LCD 225 is a liquid-crystal display device for displaying information relating to an access key, by way of example. The communication interface 226 is a communication device such as a network card for achieving a network connection. In accordance with an arrangement in which an access key is input to the mobile telephone 101 or PDA 102 by a short-distance communication device in accordance with Bluetooth or IrDA, the communication interface 226 is equipped with a short-distance communication device and communicates with a similar short-distance communication device mounted in the input unit 204, whereby an access key or the like is input to the mobile telephone 101 or PDA 102.

The device-specific mechanism 228 is a processing mechanism specific to the network device. For example, in the case of the projector 120, the mechanism is an optical system relating to image projection and a driving mechanism for driving this optical system. In the case of the digital camera 121, the mechanism is an image reader such as a CCD, an image converting circuit, an exposure control circuit and an electronic-flash circuit, etc. In the case of the video camera 122, the mechanism is an optical system for video recording, a CCD and a tape recording mechanism, etc. In the case of the scanner 123, the mechanism is an image reading mechanism, etc. In the case of the printer 124, the mechanism is a PDL (Page Description Language) analyzing circuit and an image forming mechanism, etc.

<Software Implementation>

Figure 3:
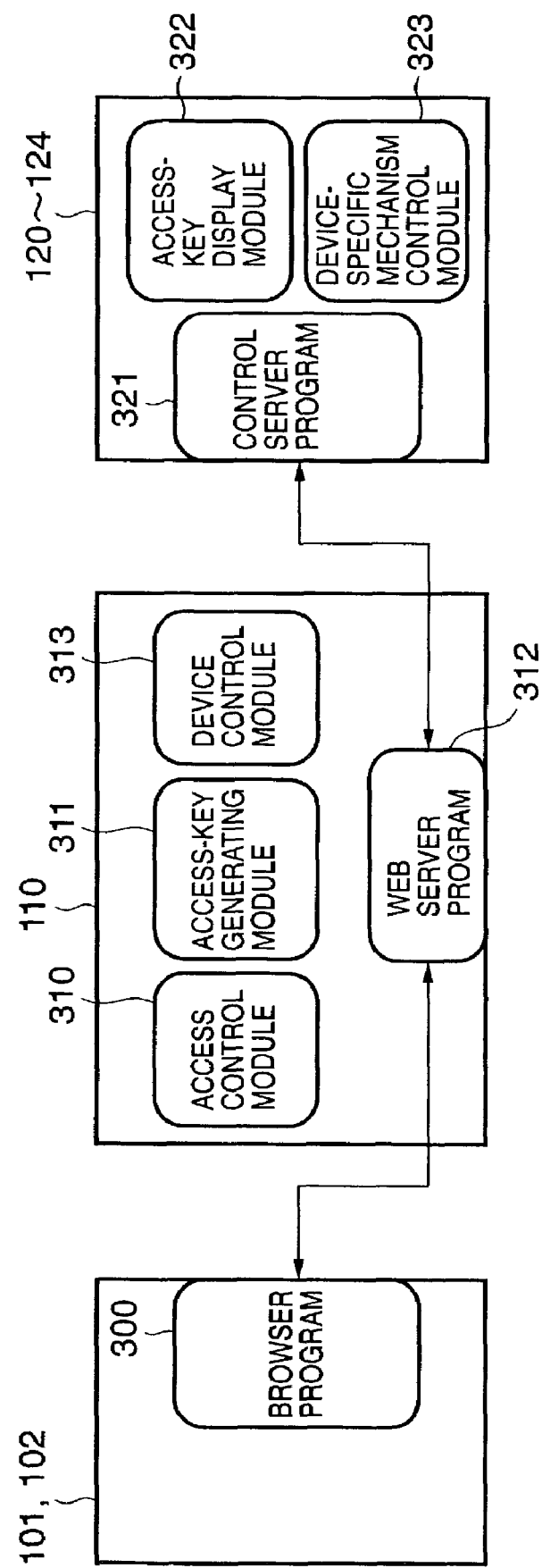
FIG. 3 is a diagram illustrating an example of software implementation according to the first embodiment.

FIG. 3 illustrates an example of the application modules of the server computer 110, etc., according to this embodiment.

The server computer 110 includes an access control module 310, an access-key generating module 311, a Web server program 312 and a device control module 313, etc.

The access control module 310 is a program module for authenticating the user (referred to as a "client" below) and determining whether this client has the right to operate the various devices 120 to 124 via the server computer 110. For example, the access control module 310 executes the above-mentioned authentication processing by searching the access-key management table 500 based upon the client name, password and access key transmitted from the mobile telephone 101 or PDA 102. By searching the access-key management table 500 based upon the access key, the access control module 310 can identify the IP address or URL of the network device that corresponds to the access key.

The access-key generating module 311 generates any access key dynamically based upon an access-key creation request from the devices 120 to 124 and stores the generated access key in the access-key management table 500 (FIG. 5), described later, in correspondence with the IP address or URL of the device. Client names and passwords also may be stored in the access-key management table 500. It should be noted that an access key is generated by the access-key generating module 311 so as not to duplicate other access keys present in the access-key management table 500, i.e., so as to be unique.

The Web server program 312 is, e.g., an HTTP (HyperText Transfer Protocol) server program and functions to acquire a communication path to another computer system, etc., transmit an object in response to an object request from a client and receive an object. As will be described later, the Web server program 312 reports an access key to the network devices 120 to 124 via the Internet 130 and receives an access key from the mobile telephone 101 or PDA 102 via the communication interface 216 and the Internet 130.

The device control module 313 functions to issue an operation command for operating each device to the device in response to an operation request from the client. A control screen conforming to the specified network device is provided to the mobile telephone 101, etc.

In a case where the access control module 310, access-key generating module 311 and device control module 313 send and receive data to and from the mobile telephone 101, PDA 102 and network devices 120 to 124, the Web server program 312 intervenes in the exchange of data between the modules 310, 311, 313 and the communication interface 216.

These modules or programs 310 to 313 are programs that have been stored in the ROM 212. The CPU 211 controls the various units in accordance with these programs and the server 110 performs the operations described below.

The application modules in the network devices 120 to 124 will be described next.

Though the devices 120 to 124 have modules for implementing device-specific functions, the details thereof are not described. Each of the network devices 120 to 124 is composed of a control server program 321 and an access-key display module 322.

The control server program 321 has functions similar to those of the Web server program 312. The access-key display module 322, which serves as an HTTP client, has a function for creating an object request to the Web server program 312, a function for transmitting the object request, etc., a function for receiving an object from the Web server program 312 and a function for outputting a received access key to an output unit such as the LCD 225. The access key may be output from the device-specific mechanism 228. For example, if the network device is the projector 120, the device displays the access key on its screen. If the device is the printer 124, the device may print out the access key.

<Flow of System Processing>

Figure 4:
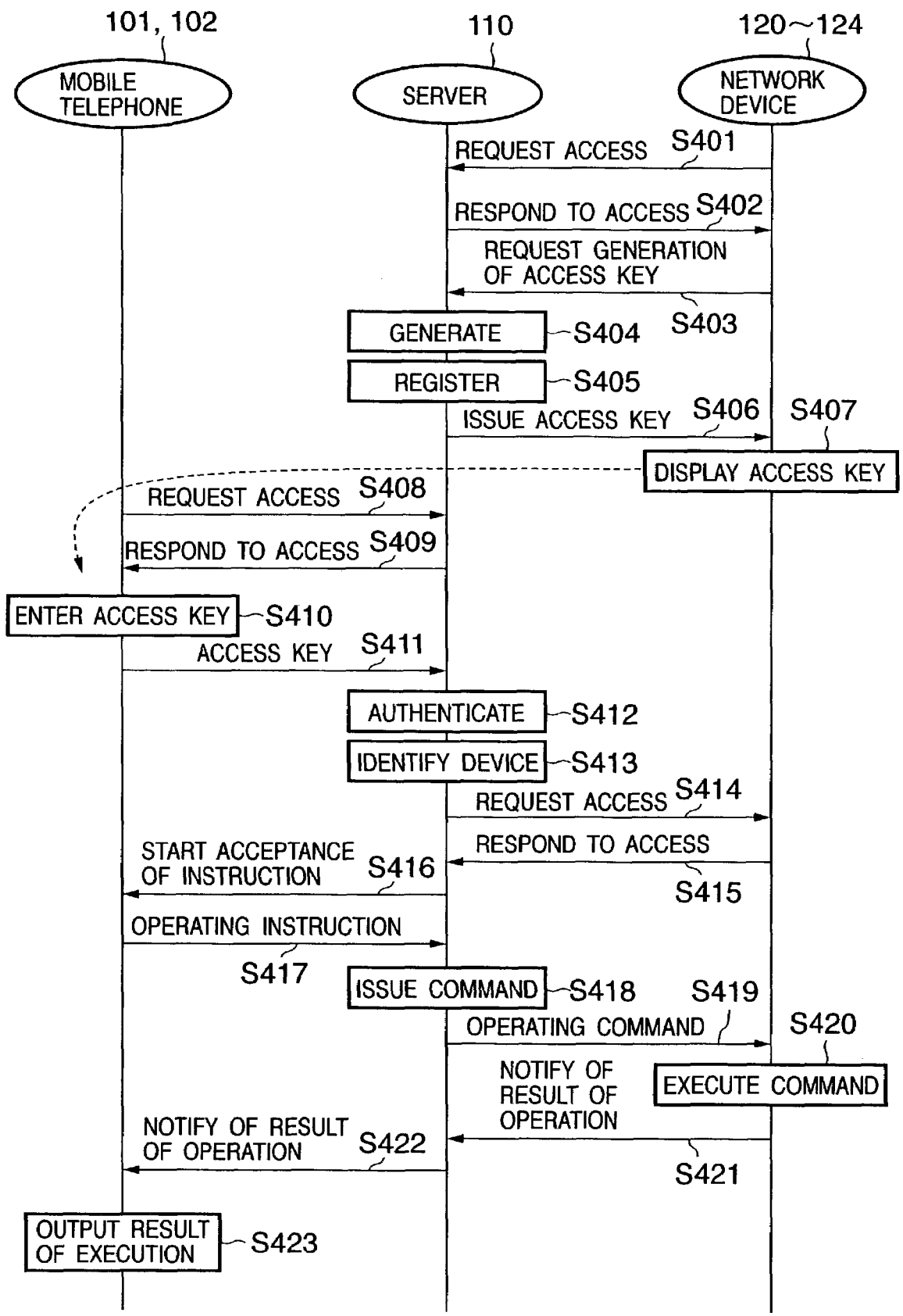
FIG. 4 is a diagram illustrating an example of a processing sequence according to the first embodiment.

FIG. 4 is a processing sequence diagram according to this embodiment. When a power supply of the network devices 120 to 124 is turned on, the access-key display module 322 starts up. The access-key display module 322 delivers the IP address or URL of the server computer 110 to the control server program 321 and commands transmission of a request to generate an access key.

At step S401, the control server program 321 transmits an access request to the server computer 110.

Next, at step S402, the Web server program 312 of the server computer 110 responds to the access request and transmits an answer message. The answer message is received by the control server program 321.

The control server program 321 transmits an access-key generate request at step S403. The Web server program 312 receives this request and starts up the access-key generating module 311. It should be noted that the IP address of the device that transmitted the generate request can be acquired from the header of a packet. Further, the Web server program 312 requests the control server program 321 of the network device to transmit information relating to the URL, whereby the URL may be acquired. The Web server program 312 delivers the acquired IP address or URL to the access-key generating module 311.

The access-key generating module 311 that has been started up generates the access key dynamically at step S404. The reason for generating the access key dynamically is that frequently changing the access key diminishes decoding of the access key by malicious third parties. If reducing the level of security is allowed, the access key may be generated statically.

The access-key generating module 311 stores the IP address or URL of the network device that transmitted the access-key generation request in a key table 502 of the access-key management table 500 in correspondence with generated access key at step S405.

Figure 5:
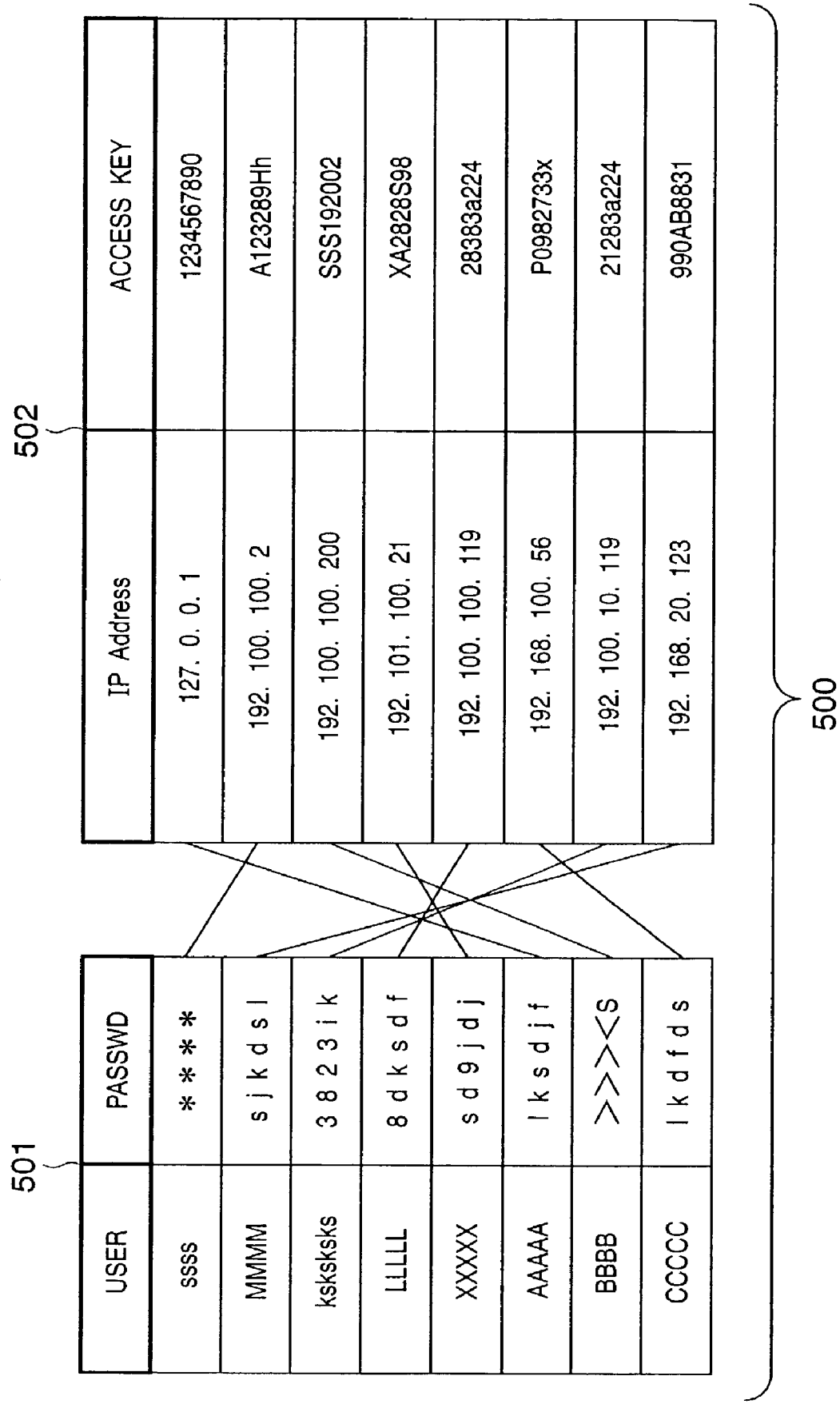
FIG. 5 is a diagram illustrating an example of an access-key management table according to the first embodiment.

FIG. 5 is a conceptual view of the access-key management table 500 according to this embodiment. The access-key management table 500 has been stored in the hard-disk drive 217 (or in RAM 213).

The access-key management table 500 includes a client table 501 and the key table 502. The client table 501 and key table 502 both can be read, written and searched. The client table 501 is a table that stores client names and passwords. The key table 502 is a table that stores IP addresses or URLs of devices that have transmitted access-key generation requests and the access keys that have been generated. The records of the client table 501 and key table 502 can be correlated or have such correlation deleted by the access-key generating module 311.

The access-key generating module 311 transmits the access key to the network devices 120 to 124 via the Web server program 312 at step S406.

The control server program 321 of the network devices 120 to 124 receives the access key and delivers it to the access-key display module 322 at step S407. The access-key display module 322 displays this access key on the LCD 225, etc. As will be described later, the user of the mobile telephone 101 or PDA 102 inputs the access key, which has been displayed on the LCD 225, to the mobile telephone 101 or PDA 102. In another configuration, the access key is transferred from the network devices 120 to 124 to the mobile telephone 101 or PDA 102 and is set in the mobile telephone 101 or PDA 102.

Figure 6:
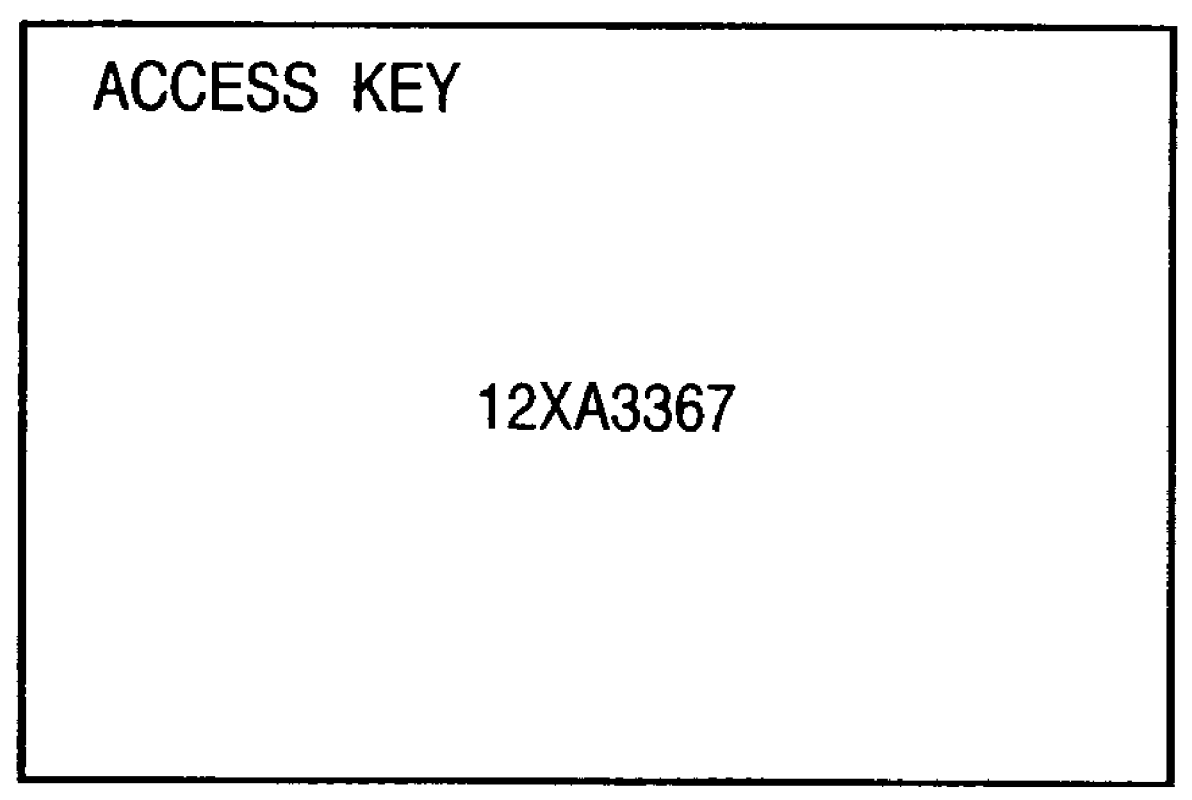

FIG. 6 is a diagram showing an example of an access key displayed on the LCD 225. This may be output by the device-specific mechanism 228, as described earlier. The access key that has been output is confirmed by the client of the mobile telephone 101 or PDA 102.

On the other hand, a browser 300 of the mobile telephone 101 or PDA 102 is launched. An access request is transmitted to the server computer 110 at step S408 based upon the URL or IP address of the server computer 110 entered by the user.

Figure 7:
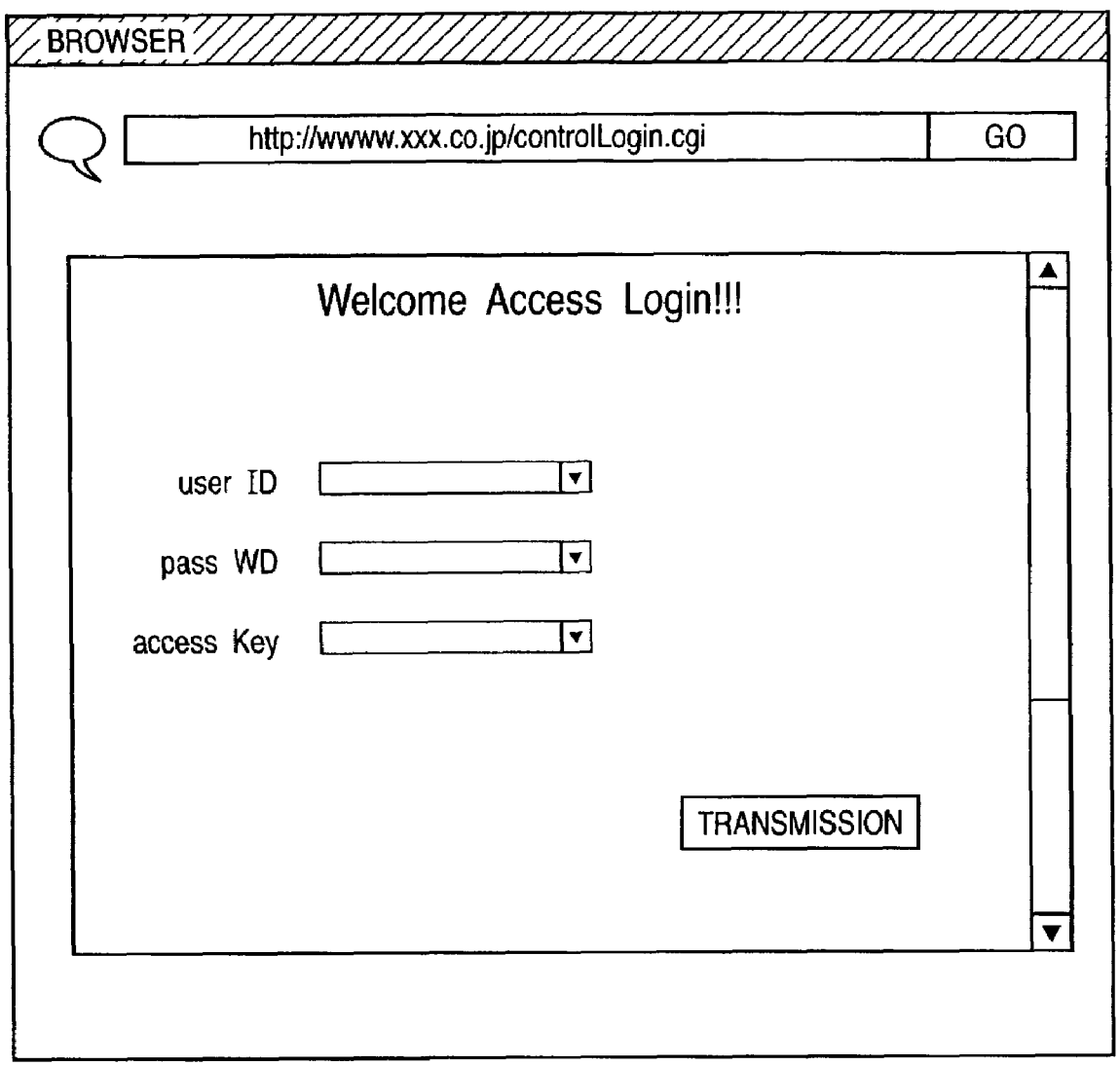
FIG. 7 is a diagram illustrating an example of a server log-in screen according to the first embodiment.

At step S409, the Web server program 312 transmits authentication screen information (access-key input panel information) of the kind shown in FIG. 7. By way of example, the authentication screen information is coded using HTML. Further, it is so arranged that client name, password and access key can be entered.

The browser program 300 receives and analyzes the screen information at step S410 and displays the screen exemplified by FIG. 7 on the LCD 205. In response to the screen displayed, the client name, password and the access key displayed on the network devices 120 to 124 are entered.

If a SEND button shown in FIG. 7 is clicked, the browser program 300 transmits the entered authentication information (client name, password and access key) to the access control module 310 at step S411.

When the Web server program 312 receives the authentication request that includes the client name, password and access key at step S412, the Web server program 312 starts up the access control module 310 and delivers the client name, password and access key. The access control module 310 that has started up searches the client table 501 based upon the received client name and password and decides whether the client is an authorized client. If the client is authorized, control proceeds to step S413. If the client is not authorized, the access control module 310 transmits access refusal information.

The access control module 310 retrieves the record that matches the received access key from the key table 502 at step S413. As a result, the IP address or URL of the network device is specified. Furthermore, the access control module 310 also creates a corresponding relationship between the matching record and the record of the above client name and password. (Such corresponding relationships are expressed by the lines between tables 501 and 502 in FIG. 5. In actuality, the corresponding relationships are recorded in a table, which is not shown.) The client is thenceforth capable of utilizing the network device solely by the corresponding access key. The access control module 310 starts up the device control module 313 and delivers the IP address or URL of the network device specified.

The device control module 313 transmits the access request to the specified network device (any one of devices 120 to 124) at step S414.

Next, at step S415, the control server program 321 transmits an access response to reply to the access request. In another configuration, the access response includes information relating to a menu screen for operating the network device.

The device control module 313 verifies the operating status of the network device in response to receipt of the access answer. Furthermore, in order begin acceptance of the operating instruction, the device control module 313 transmits menu screen information, which is for operating the network device, at step S416. The menu screen information may be a file created beforehand in the HTML format or may be a file that has been transmitted from the network device. The device can be operated from this screen.

The browser program 300 displays the received menu screen on the LCD 205. Furthermore, at step S417, the browser program 300 transmits information relating to the operating instruction entered from the input unit 204.

The device control module 313 issues an operating command, which corresponds to the network device (one of the devices 120 to 124), at step S418 based upon the received information relating to the operating instruction.

The device control module 313 transmits the information relating to the operating command to the control server program 321 at step S419.

Upon receiving the information relating to the operating command, the control server program 321 starts up a device-specific mechanism control module 323. The latter executes predetermined processing based upon the operating command at step S420. If the network device is the printer 124, then the latter prints out any information. If the network device is the digital camera 121, then the camera records a still image.

At step S421, the device-specific mechanism control module 323 transmits information, such as image information, that is the result of the operation.

The device control module 313 transfers the received operating-result information to the mobile telephone 101, etc., at step S422. After creating screen information that includes the result of the operation, the device control module 313 may transmit this information.

The browser program 300 displays the received operating-result information on the LCD 205 at step S423.

Thus, according to this embodiment, as set forth above, a network device to be controlled (any one of the devices 120 to 124) is specified by comparing an access key registered previously in the key table 502 and an access key that has been transmitted from the mobile telephone 101 or PDA 102. That is, if the client knows the IP address or URL of the server computer 110, then the client can control each of the network devices 120 to 124 without knowing the individual IP addresses or URLs of the network devices 120 to 124. As a result, since it is unnecessary to disclose the individual IP addresses or URLs of the network devices 120 to 124 to the client, the possibility that the network devices 120 to 124 will exploited by a malicious client can be diminished. In addition, remote control is restricted solely to a user who has ascertained the correct access key.

Furthermore, if authentication processing is executed based upon a client name or password, even greater security can be provided.

The access key is generated dynamically by the server computer 110 and is output from the network device (120 to 124) that is in the possession of the client. This makes it difficult for a malicious third party to identify the access key. It is possible, therefore, to assure a greater degree of safety.

Second Embodiment

<System Configuration>

Figure 8:
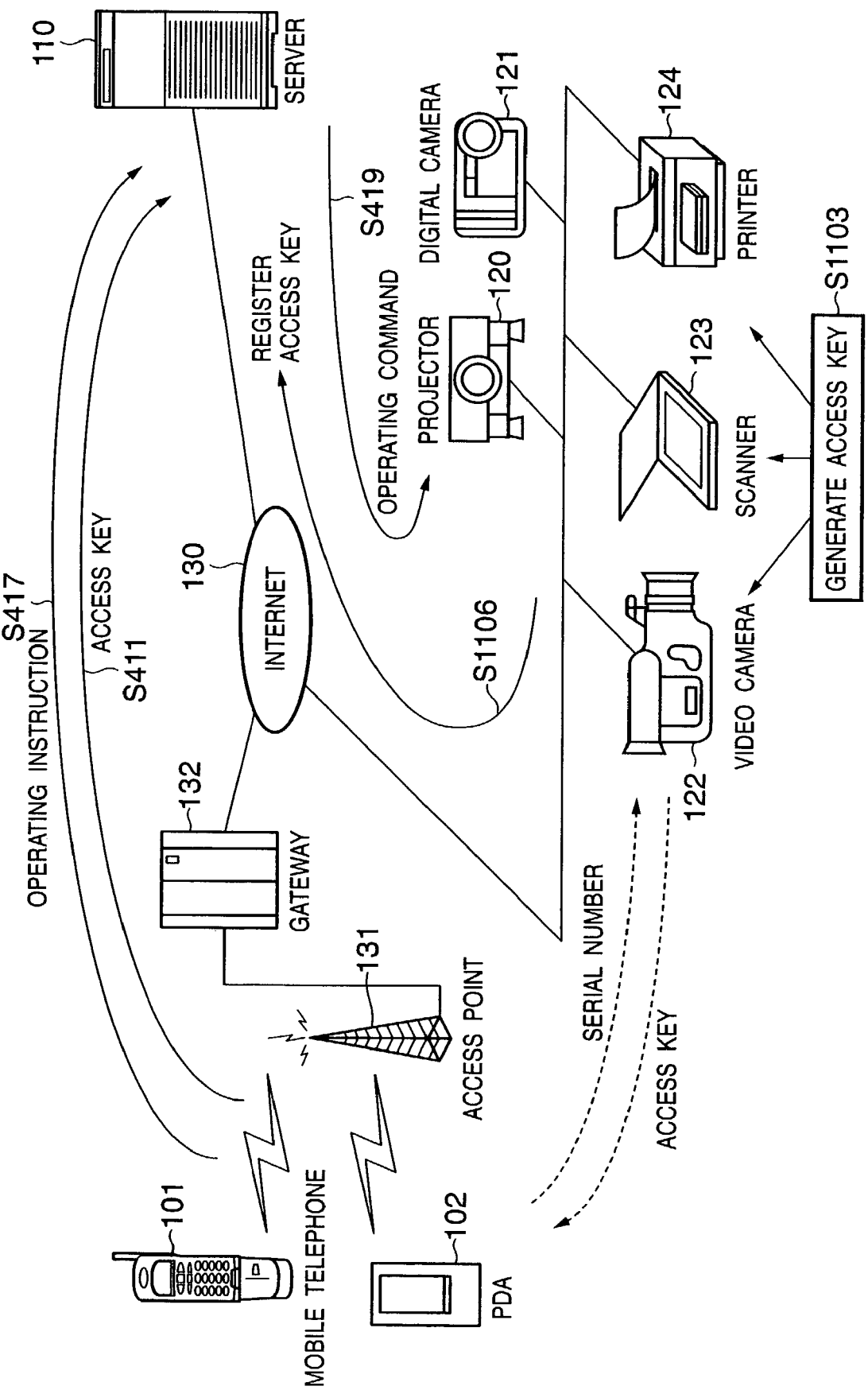
FIG. 8 is a diagram illustrating an example of the configuration of a system according to a second embodiment of the present invention.

FIG. 8 is a diagram illustrating an example of the configuration of a system according to a second embodiment of the present invention. Components identical with those of the first embodiment need not be described again. In this embodiment, the network devices 120 to 124 to be controlled generate the access keys. An access key that has been generated is registered in the server computer 110. Optionally, a unique number or the like possessed by the portable terminal may be used when an access key is generated.

<Hardware Implementation>

Figure 9:
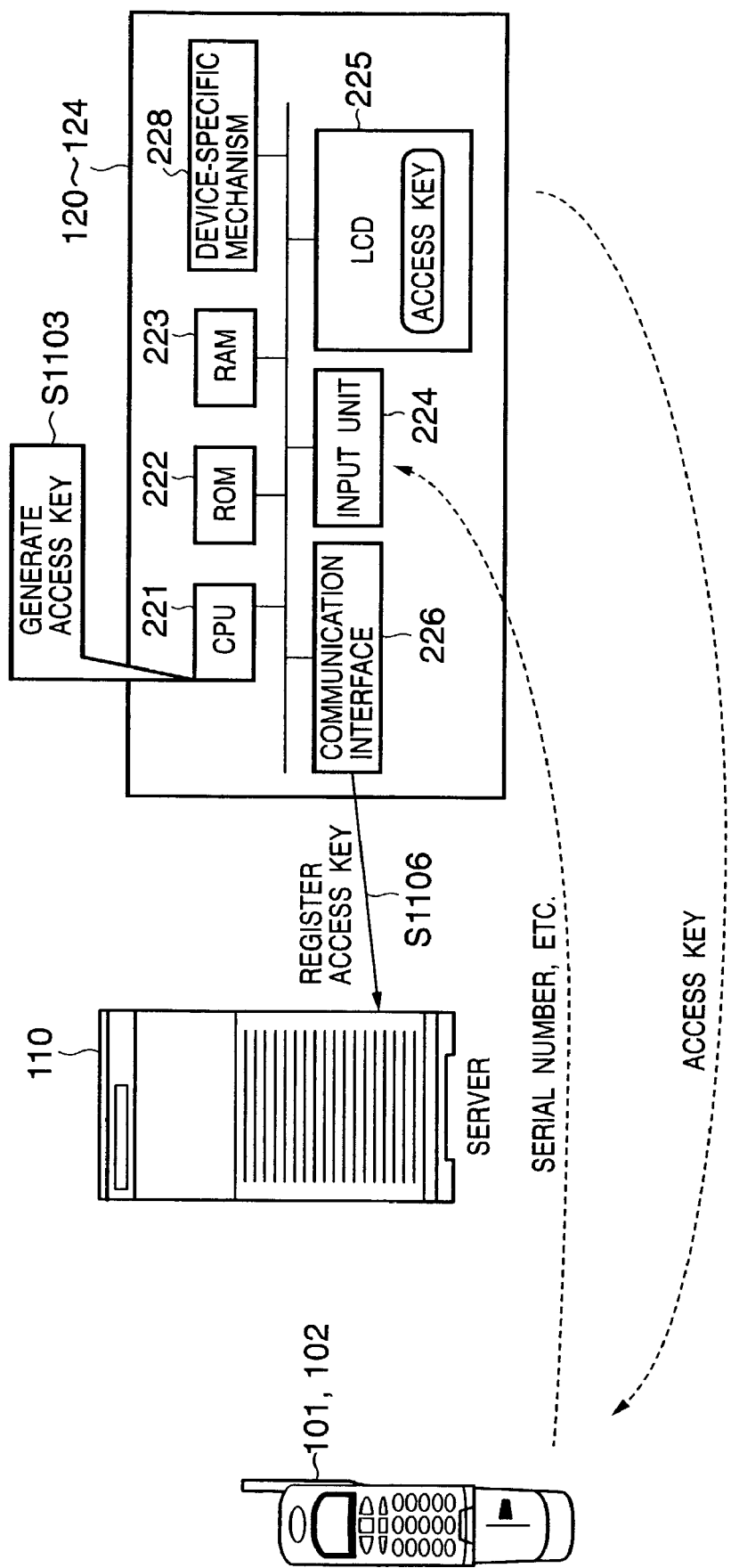
FIG. 9 is a diagram illustrating the hardware implementation of various devices according to the second embodiment.

FIG. 9 illustrates an example of hardware implementation according to this embodiment. In comparison with FIG. 2, an input unit 224 for inputting the serial number of the mobile telephone 101 or PDA 102 has been added to each of the network devices 120 to 124. The input unit 224 is a keyboard, pointing device or microphone or a short-distance communication device such as a Bluetooth or IrDA device. It should be noted that voice that has entered from a microphone is converted to characters or numerical values by a voice recognition application executed by the CPU 221. In the case of the short-distance communication device, the input unit 224 communicates with a similar short-distance communication device (not shown) mounted in the mobile telephone 101 or PDA 102, whereby the serial number is input from the mobile telephone 101 or PDA 102. Thus, so long as the input unit 224 is capable of entering information useful in generating an access key, any input device may be used.

The other components of the network devices 120 to 124 are similar to those of FIG. 2. Further, the components of the mobile telephone 101, PDA 102 and server computer 110 are similar to those of FIG. 2. For example, the communication interface 216 accepts an access key from the network devices 120 to 124, mobile telephone 101 or PDA 102 via the Internet 130.

<Software Implementation>

Figure 10:
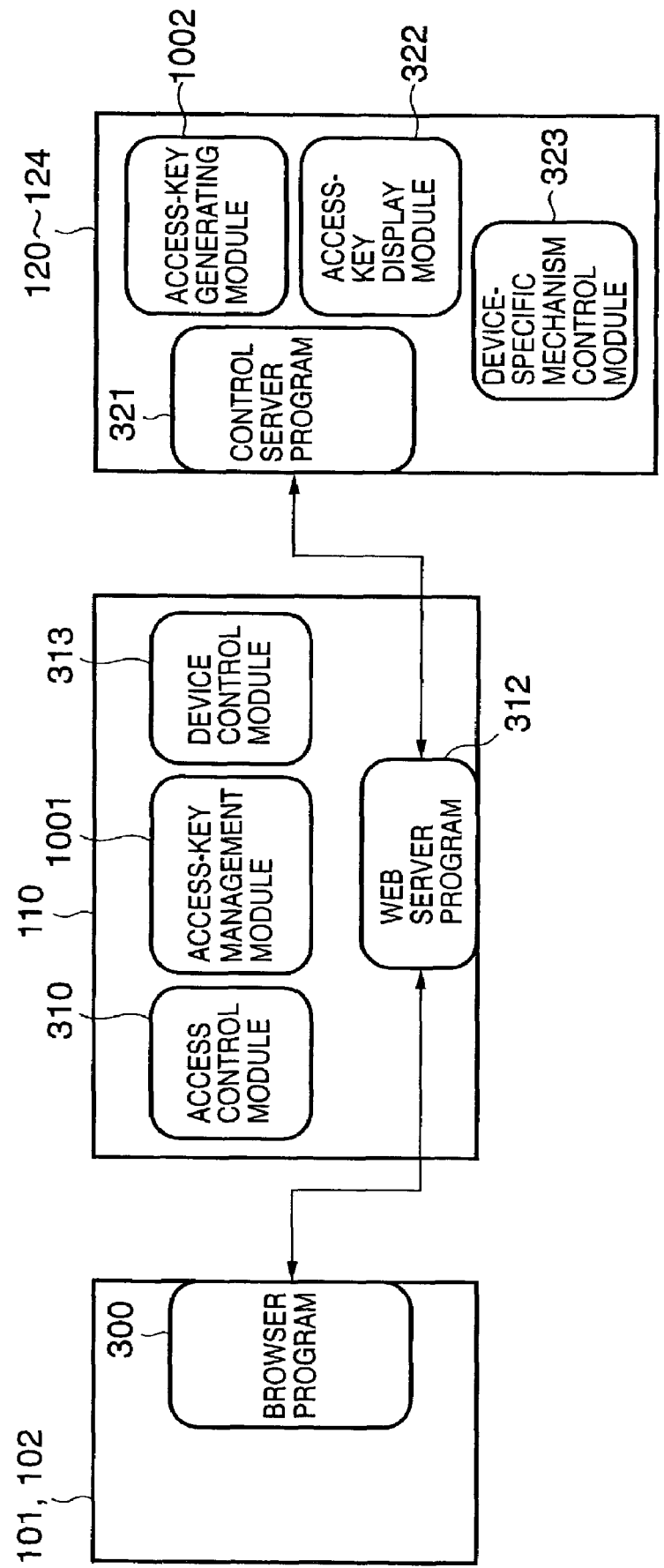
FIG. 10 is a diagram illustrating an example of software implementation according to the second embodiment.

FIG. 10 illustrates an example of the structure of the software modules according to this embodiment.

The modules of the server computer 110 will be described first. According to this embodiment, the server computer 110 is equipped with an access-key management module 1001.

When the access control module 310 accepts a serial number or access key, which is transmitted from the mobile telephone 101 or PDA 102, from the Web server program 312, the access control module 310 executes client authentication processing. More specifically, the access control module 310 searches an access-key management table 1200 (see FIG. 12), described later, and determines whether the serial number and access key have been registered, thereby executing authentication processing. If the client is an authorized client, then the client can operate the network devices 120 to 124 via the server computer 110. Processing for specifying a network device corresponding to the access key also is executed.

The access-key management module 1001 is a module for registering the access keys generated by the network devices 120 to 124 in the access-key management table 1200 in correspondence with the IP addresses or URLs of the network devices 120 to 124. Furthermore, in another configuration, the access-key management module 1001 registers the serial numbers of clients in correspondence with the IP addresses or URLs and access keys of the network devices 120 to 124.

As will be described later, the Web server program 312 accepts an access key from the network devices 120 to 124 and mobile telephone 101 or PDA 102 via the communication interface 216 and Internet 130.

In a case where the access control module 310, access-key generating module 311 and device control module 313 send data to and receive data from the mobile telephone 101, PDA 102 and network devices 120 to 124, the Web server program 312 intervenes in the exchange of data between the modules 310, 311, 313 and the communication interface 216.

These modules or programs 310, 312, 313 and 1001 are programs that have been stored in the ROM 212. The CPU 211 controls the various units in accordance with these programs and the server 110 performs the operations described below.

The software modules in the network devices 120 to 124 will be described next.

In comparison with FIG. 3, the network devices are additionally provided with an access-key generating module 1002. The module 1002 generates access keys dynamically in accordance with an operation performed by the client. As such time, according to this embodiment, the access-key generating module 1002 generates the access key using the serial number of the mobile telephone 101 or PDA 102. Here the entered serial number and a number generated randomly by a pseudo-random number algorithm or the like are connected into a single number and this is output as the access key. The generated access key is transmitted to the access-key management module 1001 via the Internet 130 and is stored in the access-key generating module 1002 (FIG. 12), described later. In another configuration, the access-key generating module 1002 transmits the access key with the IP address or URL of its own device attached when the access key is transmitted.

The access-key management module 1001 registers the received access key in the access-key management table 1200 (FIG. 12). Furthermore, the access-key management module 1001 extracts the IP address or URL, etc., from the header or payload of a packet received from the network devices 120 to 124 and registers this in the access-key management table 1200 together with the access key. Further, the access-key management module 1001 registers the serial number of the mobile telephone 101 or PDA 102 in the access-key management table 1200.

<Flow of System Processing>

Figure 11:
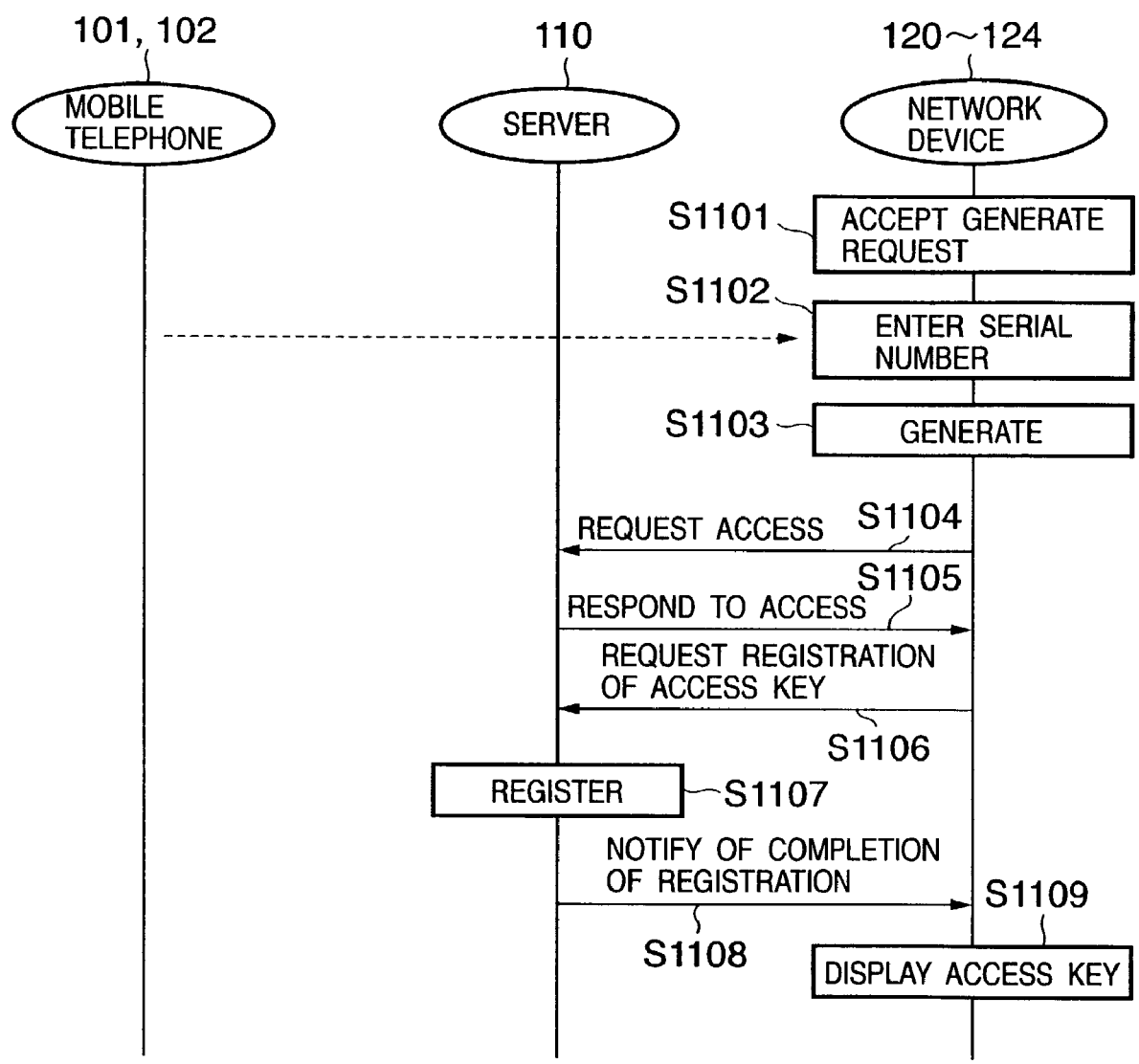
FIG. 11 is a diagram illustrating an example of a processing sequence according to the second embodiment.

FIG. 11 illustrates a sequence relating to access-key registration processing according to the second embodiment. The device among the network devices 120 to 124 to which power has been introduced executes its start-up program and the access-key generating module 1002 is called as part of initialization processing. In response to control of the input unit 224 by the client, the access-key generating module 1002 accepts an access-key generation request at step S1101. The access-key generating module 1002 further causes the LCD 225 to display a screen that prompts the client to enter a serial number, etc.

The serial number, etc., of the mobile telephone 101 or PDA 102 is entered by the client from the input unit 224 at step S1102, and the entered serial number is delivered to the access-key generating module 1002.

The access-key generating module 1002 generates an access key based upon the entered serial number at step S1103.

The access-key generating module 1002 requests access to the access-key management module 1001 of the server computer 110 via the control server program 321 at step S1104.

The access-key management module 1001 transmits an access-key response to the access-key generating module 1002 at step S1005 in order to answer the access request. The access-key generating module 1002 receives the access response.

Upon receiving the access response, the access-key generating module 1002 transmits an access-key registration request to the server computer 110 at step S1106. The access-key registration request contains the device's own IP address or URL along with the generated access key.

Upon receiving the access-key registration request, the Web server program 312 starts up the access-key management module 1001 at step S1107. The access-key management module 1001 that has been started up acquires the access key and the IP address or URL of the device from the Web server program 312 and stores these in a key table 1202 of the access-key management table 1200.

FIG. 12 is a diagram illustrating an example of the access-key management table 1200. The latter has been stored in the hard-disk drive 217 (or RAM 213). The access-key management table 1200 includes a serial-number table 1201 and the key table 1202. These tables of the access-key management table 1200 can be read, written and searched.

The serial-number table 1201 stores the serial numbers of clients. The key table 1202 stores the access keys generated by respective ones of the devices and the IP addresses or URLs of these devices. The records of the serial-number table 1201 and key table 1202 can be mutually correlated or can have such correlation deleted.

When registration of an access key, etc., is completed, the access-key management module 1001 transmits notification of registration completion via the Web server program 312 at step S1108. Upon receiving this notification, the access-key generating module 1002 commands the access-key display module 322 to display the registered access key. The access-key display module 322 causes the received access key to be displayed on the LCD 225. Thus, the client is capable of ascertaining the access key. As long as the timing of access-key display is after the access key is generated, any timing is permissible.

Since the processing from this point onward is substantially the same as that from step S408 onward in FIG. 4, this processing will be described with reference to FIG. 4.

The client who has confirmed the access key accesses the server computer 110 from the browser program 300 of the mobile telephone 101 or PDA 102 (steps S408, S409 in FIG. 4).

Figure 13:
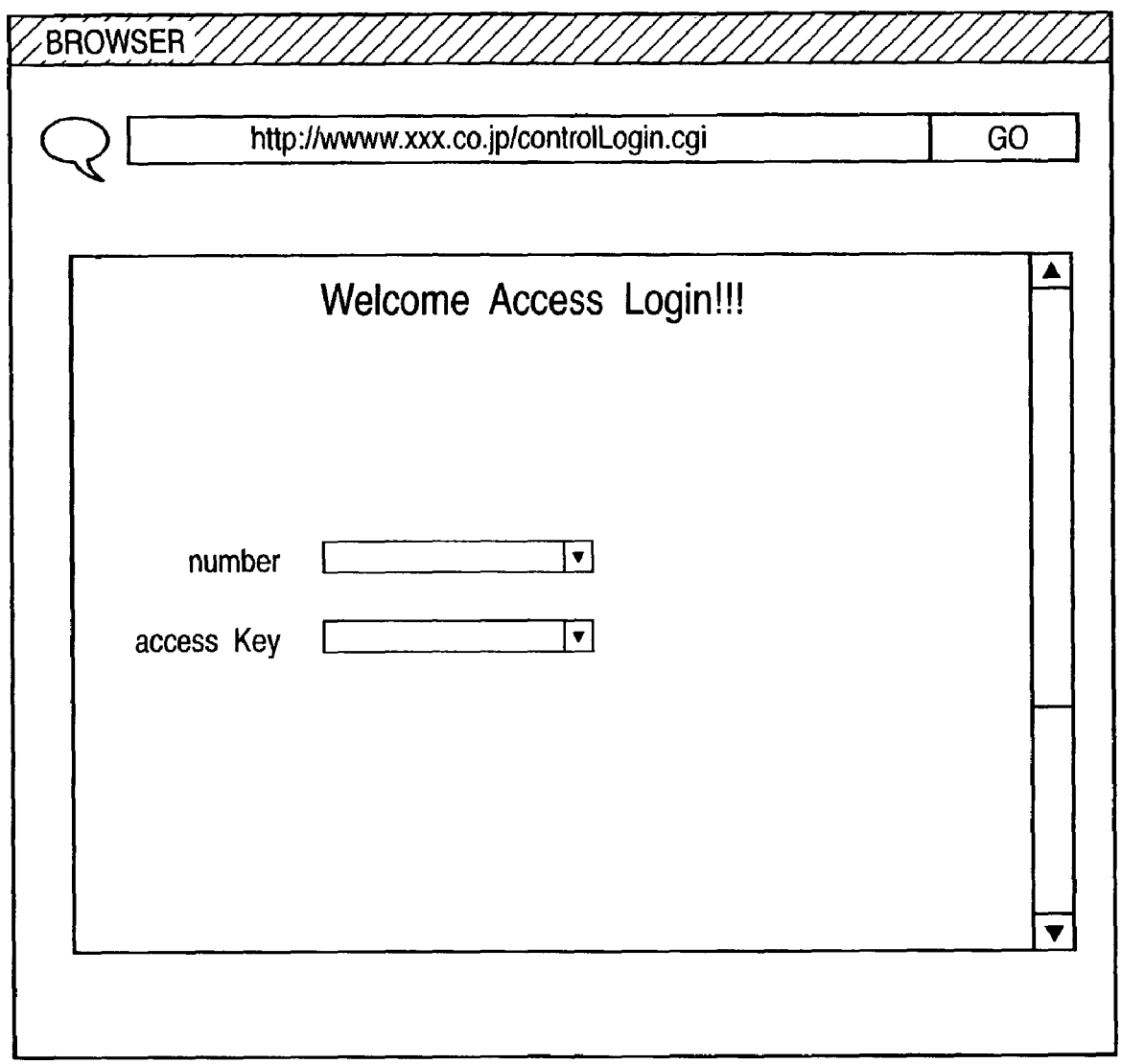
FIG. 13 is a diagram illustrating an example of a server log-in screen according to the second embodiment.

FIG. 13 is a diagram illustrating an input screen for a serial number and access key serving as one example of an access response transmitted from the server computer 110 to the mobile telephone 101 and PDA 102. The mobile telephone 101 and PDA 102 display the screen shown in FIG. 13. At step S410, the client enters the access key, which has been displayed on the LCD 225 of the network device, from the input unit 204 together with the serial number of mobile telephone 101 or PDA 102. The serial number and access key are transmitted at step S411.

Upon receiving the serial number and access key, the Web server program 312 starts up the access control module 310. If the received serial number has not been registered in the serial-number table 1201 of the access-key management table 1200 (i.e., if this is the first time access is being performed using this serial number), then the activated access control module 310 stores this serial number in the serial-number table 1201. Further, the access control module 310 searches the key table 1202 and determines whether a record identical with that of the transmitted access key is present. If the record does not exist, a message to the effect that the system cannot be utilized is transmitted to the client.

If the record does exist, the access control module 310 analyzes the access key of the key table 1202, extracts the serial number and determines whether the extracted serial number and the transmitted serial number match. According to this embodiment, the access key is constructed by connecting, into a single number, the serial number and the number (four digits in FIG. 12) randomly generated by the pseudo-random number algorithm. If the serial number is determined to be incorrect, a message to the effect that the system cannot be utilized is transmitted to the client.

If the serial number is found to be correct, the access control module 310 correlates the record containing this serial number of the serial-number table 1201 and the record of the key table 1202. From this point onward, this serial number is such that only the correlated access key becomes utilizable. Further, the access control module 310 acquires the IP address or URL recorded in the key table 1202 in correspondence with the access key. These processing steps correspond to steps S412, S413.

From this point onward, processing is similar to that of steps S414 to S423. For example, the server computer 110 receives an operating instruction from the mobile telephone 101 at step S417 and transmits an operating command to the network devices 120 to 124 at step S419.

In FIG. 10, the mobile telephone 101, PDA 102, server computer 110 and network devices 120 to 124 are connected in order to simplify the description. However, the present invention is applicable even if a plurality of the mobile telephone 101, PDA 102 and server computer 110 are provided.

Thus, according to this embodiment, as described above, whether a client is an authorized client can be verified by comparing a serial number contained in an access key with a serial number that has been transmitted from a mobile telephone 101 or PDA 102 or by comparing an access key registered previously in a table and an access key that has been transmitted from mobile telephone 101 or PDA 102. The serial number is a unique number and the access key is generated dynamically in dependence upon the serial number. As a result, it is very difficult for a malicious client to identify both of these items of information simultaneously. Further, since the access key is output from the network device possessed by the client, it is difficult for a malicious client to identify the access key. This makes it possible to assure a greater level of security.

Further, this embodiment describes an example of an access key. Of course, methods of generating access keys other than that described may of course be used. That is, an access key may be generated using a unique number possessed by the client.

Further, according to this embodiment, if the client knows the IP address or URL of the server computer 110, the client can control the network devices 120 to 124 without knowing the individual IP addresses or URLs of the network devices 120 to 124. Accordingly, since it is unnecessary to disclose the individual IP addresses or URLs of the network devices 120 to 124 to the client, the possibility that the network devices 120 to 124 will exploited by a malicious client can be diminished.

Other Embodiments

In each of the above embodiments, the server 110 issues an operating command (step S419). However, the server 110 may report the addresses of the network devices 120 to 124 to the mobile telephone 101 or PDA 102, and the mobile telephone 101 or PDA 102 may issue the operating command.

Furthermore, the present invention is attained also by supplying a storage medium storing the program codes of the software for performing the functions of the foregoing embodiments to a system or an apparatus, reading the program codes with a computer (e.g., a CPU or MPU) of the system or apparatus from the storage medium, and then executing the program codes.

In this case, the program codes per se read from the storage medium implement the novel functions of the embodiment, and the storage medium storing the program codes constitutes the invention.

Examples of storage media that can be used for supplying the program code are a floppy disk, hard disk, optical disk, magneto-optical disk, CD-ROM, CD-R, magnetic tape, non-volatile type memory card, ROM or server computer connected to a network that is capable of communicating.

Furthermore, besides the case where the aforesaid functions according to the embodiment are implemented by executing the program codes read by a computer, it goes without saying that the present invention covers a case where an operating system or the like running on the computer performs a part of or the entire process in accordance with the designation of program codes and implements the functions according to the embodiment.

It goes without saying that the present invention further covers a case where, after the program codes read from the storage medium are written in a function expansion board inserted into the computer or in a memory provided in a function expansion unit connected to the computer, a CPU or the like contained in the function expansion board or function expansion unit performs a part of or the entire process in accordance with the designation of program codes and implements the function of the above embodiment.

As many apparently widely different embodiments of the present invention can be made without departing from the spirit and scope thereof, it is to be understood that the invention is not limited to the specific embodiments thereof except as defined in the appended claims.

What is claimed is:

1. An access control system, comprising:
   one or more network devices, each of the one or more network devices further comprising:
   input means for accepting a request for generation of a dynamic access key and portable wireless device identification information identifying a portable wireless device inputted via a user interface in each of the one or more network devices;
   generating means for generating a dynamic access key based on the portable wireless device identification information inputted by said input means, the dynamic access key being configured for display on the one or more network devices;
   transmitting means for transmitting the dynamic access key; and
   display means for displaying the dynamic access key on the one or more network devices; and
   an access control apparatus, the access control apparatus further comprising:
   receiving means for receiving dynamic access keys from the one or more network devices, and for receiving the dynamic access key and the portable wireless device identification information via a wireless access point from the portable wireless device on which the dynamic access key was manually entered by a user via a user interface;
   obtaining means for obtaining address information corresponding to the dynamic access key received from the portable wireless device;
   deciding means for deciding whether or not the dynamic access key received from the portable wireless device corresponds to the portable wireless device identification information; and
   detecting means for detecting address information for the one or more network devices from which the dynamic access keys are transmitted.

2. The system according to claim 1, wherein said obtaining means transmits a command to one of the one or more network devices corresponding to the dynamic access key in accordance with an instruction received from the portable wireless device.

3. The system according to claim 1, wherein said receiving means provides the device with access-key input panel information to be displayed on a user interface of the portable wireless device.

4. An access control method, comprising:
   inputting a request to generate a dynamic access key in one or more network devices via user interfaces in the one or more network devices;
   inputting portable wireless device identification information identifying a portable wireless device via the user interfaces in the one or more network devices;
   generating dynamic access keys based on the portable wireless device identification information inputted via the user interfaces in the one or more network devices, the dynamic access key being configured for display on the one or more network devices;
   transmitting the dynamic access keys from the one or more network devices to an access control apparatus;
   displaying each of the dynamic access keys on displays in the one or more network devices;
   transmitting at least one dynamic access key manually input by a user via a user interface into the portable wireless device;
   receiving, in the access control apparatus, the dynamic access keys from the one or more network devices and the at least one dynamic access key and the portable wireless device identification information from the portable wireless device;
   deciding, in the access control apparatus, whether or not the dynamic access key received from the portable wireless device correspond to the portable wireless device identification information;
   detecting, in the access control apparatus, address information for the one or more network devices from which the dynamic access keys are transmitted; and
   obtaining, in the access control apparatus, the address information corresponding to the dynamic access key received from the portable wireless device.

5. An access control system comprising:
   one or more network devices, and
   an access control apparatus comprising:
   first receiving means for receiving requests for dynamic access keys from the one or more network devices;
   detecting means for detecting address information for the one or more network devices from which the requests are received;
   generating means for generating dynamic access keys configured for display to a user;
   storing means for storing the dynamic access keys corresponding to address information of the one or more network devices detected by said detecting means;
   transmitting means for transmitting the dynamic access keys to the one or more network devices:
   second receiving means for receiving, from a portable wireless device, via a wireless access point, a dynamic access key displayed on one of the one or more network devices and manually entered by a user into the portable wireless device via a user interface; and
   obtaining means for obtaining the address information corresponding to the dynamic access key received from the portable wireless device,
   wherein each of the one or more network devices comprise:
   request means for requesting the dynamic access key from the access control apparatus;
   third receiving means for receiving the dynamic access key from the access control apparatus; and
   display means for displaying the dynamic access key received by said third receiving means.

6. An access control method, comprising:
   receiving, at an access control apparatus, requests for dynamic access keys from one or more network devices;
   detecting access information from the one or more network devices from which the requests are received;
   generating, at the access control apparatus, dynamic access keys configured for display to a user;
   storing, at the access control apparatus, the dynamic access keys corresponding to address information of the one or more network devices detected in said detecting step;
   transmitting the dynamic access keys from the access control apparatus to the one or more network devices;

receiving, at the one or more network devices, the dynamic access keys from the access control apparatus and displaying the dynamic access keys on the one or more network devices;

receiving, at the access control apparatus, at least one dynamic access key via wireless communication from a portable wireless device after the access key displayed on the one or more network devices is manually entered by a user into the portable wireless device via a user interface;

receiving, at the access control apparatus, the at least one dynamic access key from the portable wireless device via a wireless access point; and obtaining, at the access control device, the address information corresponding to the access key received from the portable wireless device.

7. The system according to claim 5, wherein said first receiving means receives the requests generated by the one or more network devices when the one or more network devices are powered on.

8. The method according to claim 6, wherein the requests for the dynamic access key generated by the one or more network devices when the one or more network devices are powered on are received at the access control apparatus.

* * * * *